US012553473B2

(12) United States Patent
Yano et al.

(10) Patent No.: US 12,553,473 B2
(45) Date of Patent: Feb. 17, 2026

(54) THRUST BEARING

(71) Applicants: JTEKT CORPORATION, Kariya (JP); NAKANISHI METAL WORKS CO., LTD., Osaka (JP)

(72) Inventors: Hiroshi Yano, Okazaki (JP); Mitsuru Saito, Osaka (JP); Kohei Shibata, Osaka (JP)

(73) Assignees: JTEKT CORPORATION, Kariya (JP); NAKANISHI METAL WORKS, CO., LTD., Osaka (JP)

( * ) Notice: Subject to any disclaimer, the term of this patent is extended or adjusted under 35 U.S.C. 154(b) by 90 days.

(21) Appl. No.: 18/287,838

(22) PCT Filed: May 7, 2021

(86) PCT No.: PCT/JP2021/017558
§ 371 (c)(1),
(2) Date: Oct. 20, 2023

(87) PCT Pub. No.: WO2022/234667
PCT Pub. Date: Nov. 10, 2022

(65) Prior Publication Data
US 2024/0183404 A1    Jun. 6, 2024

(51) Int. Cl.
*F16C 33/78* (2006.01)
*F16C 19/16* (2006.01)
*F16C 35/04* (2006.01)

(52) U.S. Cl.
CPC .......... *F16C 33/7816* (2013.01); *F16C 19/16* (2013.01); *F16C 35/042* (2013.01)

(58) Field of Classification Search
CPC .... F16C 33/7816; F16C 19/16; F16C 35/042; F16C 33/761; F16C 19/10; F16C 33/767;
(Continued)

(56) References Cited

U.S. PATENT DOCUMENTS 4,400,041 A    8/1983  Lederman
4,780,005 A    10/1988 Toyoshima et al.
(Continued)

FOREIGN PATENT DOCUMENTS

CN    1530560 A    9/2004
CN    102224352 A   10/2011
(Continued)

OTHER PUBLICATIONS

Jun. 8, 2021 International Search Report issued in International patent Application No. PCT/JP2021/017558.

*Primary Examiner* — John Olszewski
*Assistant Examiner* — Aimee Tran Nguyen
(74) *Attorney, Agent, or Firm* — Oliff PLC

(57) ABSTRACT

A thrust bearing that can improve the effect of preventing entry of muddy water etc. The thrust bearing includes: an annular first bearing ring; an annular second bearing ring facing the first bearing ring in an axial direction; a plurality of rolling elements rollably arranged between the first bearing ring and the second bearing ring; an outer seal provided on the second bearing ring, located radially outward of the rolling elements, and sealing a space between the first bearing ring and the second bearing ring; and a cover covering the outer seal from outside in a radial direction.

3 Claims, 5 Drawing Sheets

(58) Field of Classification Search
CPC .............. F16C 2326/05; F16C 19/12; B60G 2204/418; B60G 2400/64
See application file for complete search history.

(56) References Cited

U.S. PATENT DOCUMENTS

| | | | |
|---|---|---|---|
| 5,618,116 | A | 4/1997 | Ishikawa |
| 11,912,083 | B2* | 2/2024 | Yan .......................... F16C 33/76 |
| 2011/0311177 | A1 | 12/2011 | Viault et al. |
| 2018/0023626 | A1 | 1/2018 | Yano et al. |
| 2020/0116196 | A1* | 4/2020 | Blanchard ............... F16C 19/10 |
| 2021/0172478 | A1* | 6/2021 | Yan ....................... F16C 35/042 |

FOREIGN PATENT DOCUMENTS

| | | |
|---|---|---|
| CN | 102434575 A | 5/2012 |
| CN | 111720446 A | 9/2020 |
| EP | 2 336 589 A1 | 6/2011 |
| JP | S58-124825 A | 7/1983 |
| JP | S62-134922 U | 8/1987 |
| JP | S62-179424 U | 11/1987 |
| JP | H07-077220 A | 3/1995 |
| JP | H07-332378 A | 12/1995 |
| JP | 2018-017255 A | 2/2018 |
| WO | 2008/081122 A2 | 7/2008 |
| WO | 2019/119320 A1 | 6/2019 |
| WO | 2019/178752 A1 | 9/2019 |

\* cited by examiner

THRUST BEARING

TECHNICAL FIELD

The present disclosure relates to thrust bearings.

BACKGROUND ART

In a strut-type suspension, a thrust bearing is provided between an upper spring seat that receives a coil spring and an upper support that supports an upper end portion of a strut (see, for example, Patent Document 1). As shown in, for example, FIG. 4, this thrust bearing 120 includes: a first bearing ring 121 and a second bearing ring 122 that face each other in the axial direction; a plurality of balls 123 arranged between the first bearing ring 121 and the second bearing ring 122; and a cage 124 that holds the plurality of balls 123. An inner seal 131 and an outer seal 132 are integrally provided on the second bearing ring 122, and the inner seal 131 and the outer seal 132 are each in contact with an upper spring seat 114. The inner seal 131 and the outer seal 132 seal the space between the first bearing ring 121 and the second bearing ring 122 to reduce entry of water and foreign matter such as muddy water into the space.

FIG. 5 is an illustration showing an assembly process of the thrust bearing. When assembling the thrust bearing, the second bearing ring 122 is brought toward the first bearing ring 121 with both the balls 123 and the cage 124 set thereon in the direction of arrow A from above and is attached to the first bearing ring 121. In this assembly process, a lip 132c of the outer seal 132 is elastically deformed in the direction of arrow B and thus reversely bent when it comes into contact with a radial outer end P of the first bearing ring 121. As the lip 132c of the outer seal 132 then passes the radial outer end P of the first bearing ring 121, it elastically returns in the opposite direction to the direction of arrow B and comes into contact with the outer peripheral surface of the first bearing ring 121.

RELATED ART DOCUMENTS

Patent Documents

Patent Document 1: Japanese Unexamined Patent Application Publication No. 2018-17255 (JP 2018-17255 A)

SUMMARY OF THE INVENTION

Problem to be Solved by the Invention

The larger the force (strain force) with which the lip 132c contacts the outer peripheral surface of the first bearing ring 121, the higher the sealing performance of the outer seal 132, and the more the effect of preventing entry of muddy water etc. can be improved. However, if the rigidity of the outer seal 132 is increased in order to increase the strain force of the lip 132c, the lip 132c will not elastically return in the opposite direction to the direction of arrow B and remains reversely bent during assembly of the thrust bearing, which is more likely to result in defective assembly. Therefore, the rigidity of the outer seal 132 cannot be increased so much, and there is a limit to improving the effect of preventing entry of muddy water etc.

In view of the above circumstances, it is an object of the present disclosure to improve the effect of preventing entry of muddy water etc. into a thrust bearing.

Means for Solving the Problem

A thrust bearing according to an aspect of the present disclosure includes: an annular first bearing ring; an annular second bearing ring facing the first bearing ring in an axial direction; a plurality of rolling elements rollably arranged between the first bearing ring and the second bearing ring; an outer seal provided on the second bearing ring and sealing a space between the first bearing ring and the second bearing ring on an outer peripheral portion side of the first bearing ring and the second bearing ring; and a cover covering the outer seal from outside in a radial direction.

Effects of the Invention

According to the present disclosure, it is possible to improve the effect of preventing entry of muddy water etc. into the thrust bearing.

MODES FOR CARRYING OUT THE INVENTION

Overview of Embodiments of Present Disclosure

An overview of the embodiments of the present disclosure will be described below.

(1) A thrust bearing of the embodiment includes: an annular first bearing ring; an annular second bearing ring facing the first bearing ring in an axial direction; a plurality of rolling elements rollably arranged between the first bearing ring and the second bearing ring; an outer seal provided on the second bearing ring and sealing a space between the first bearing ring and the second bearing ring on an outer peripheral portion side of the first bearing ring and the second bearing ring; and a cover covering the outer seal from outside in a radial direction.

According to this configuration, the cover can reduce the possibility that muddy water etc. may reach the outer seal. Therefore, the effect of preventing entry of muddy water etc. can be enhanced without the need to increase the rigidity of the outer seal.

(2) In the thrust bearing of the embodiment, the cover includes a support portion that contacts an outer peripheral surface of the outer seal and presses the outer seal from the outside in the radial direction.

According to this configuration, radially outward elastic deformation of the outer seal is reduced using the cover, and the strain force of the outer seal against the first bearing ring can be increased.

(3) In the thrust bearing of the embodiment, the cover includes an extended portion extending from the second bearing ring side toward a mount member to which the first bearing ring is attached.

According to such a configuration, the possibility that muddy water etc. may reach the outer seal can be effectively reduced.

(4) In the thrust bearing of the embodiment, there is a space among the extended portion, the outer seal, and the mount member.

According to such a configuration, even if muddy water etc. enters between the outer seal and the extended portion, the muddy water etc. can be moved within the space. This can reduce clogging of muddy water etc. between the outer seal and the extended portion.

Details of Embodiments of Present Disclosure

Hereinafter, the embodiments of the present invention will be described in detail with reference to the drawings. At least parts of the embodiments described below may be combined as desired.

First Embodiment

[Configuration of Strut-Type Suspension]

Figure 1:
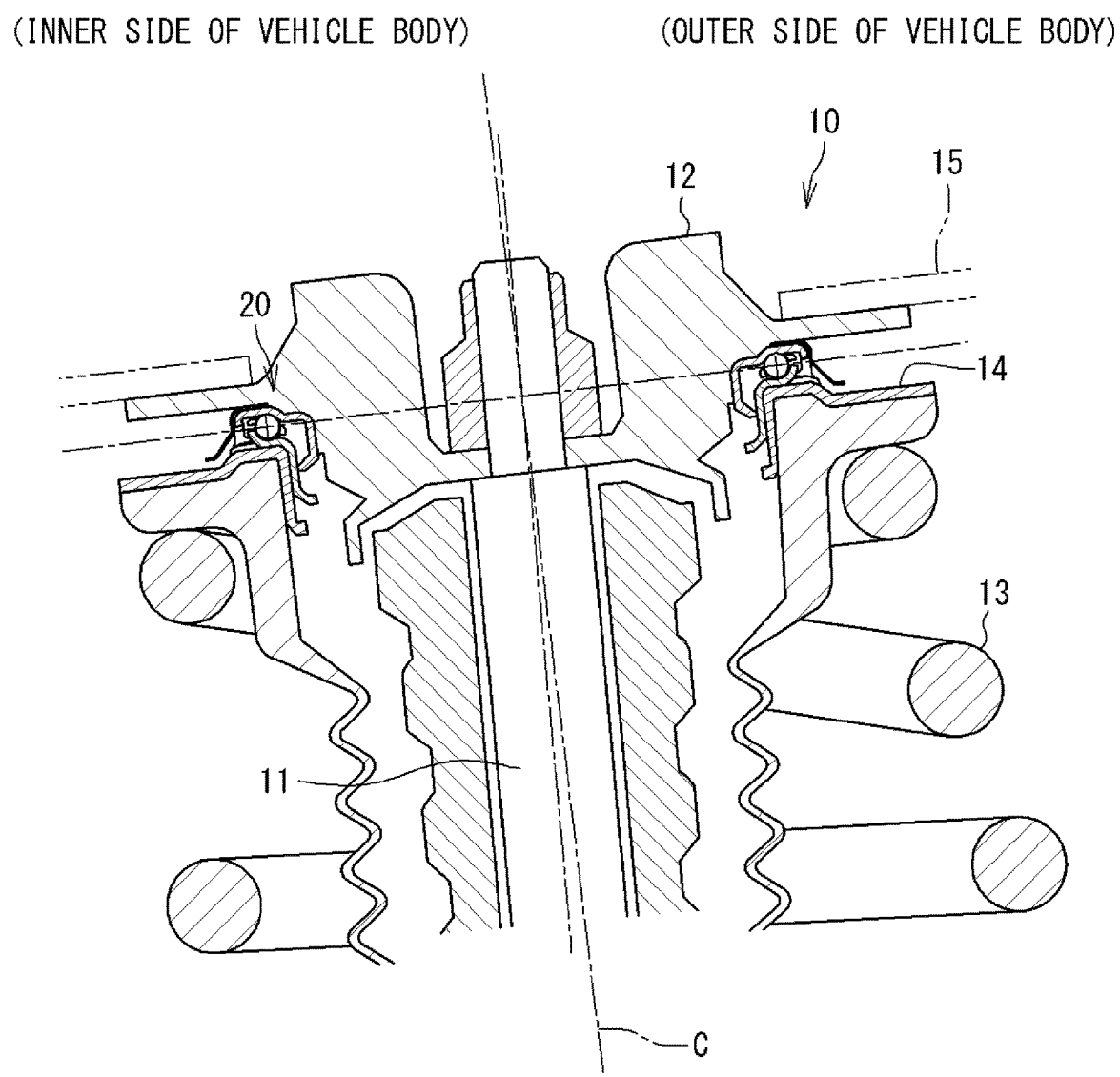
FIG. 1 is a sectional view of a strut-type suspension to which a thrust bearing according to a first embodiment is applied.

FIG. 1 is a sectional view of a strut-type suspension to which a thrust bearing according to a first embodiment is applied.

A strut-type suspension 10 has a strut 11, an upper support 12, a coil spring 13, an upper spring seat 14, a thrust bearing 20, etc.

The strut 11 contains a shock absorber and generates a damping force by viscous resistance of hydraulic fluid. The upper support 12 is attached to a vehicle body 15 and supports an upper end portion of the strut 11. The coil spring 13 is disposed around the strut 11 and absorbs impact from a road surface. The upper spring seat 14 receives and supports the upper end of the coil spring 13. The lower end of the coil spring 13 is supported by a lower spring seat, not shown, provided on the lower side of the strut 11.

[Configuration of Thrust Bearing]

Figure 2:
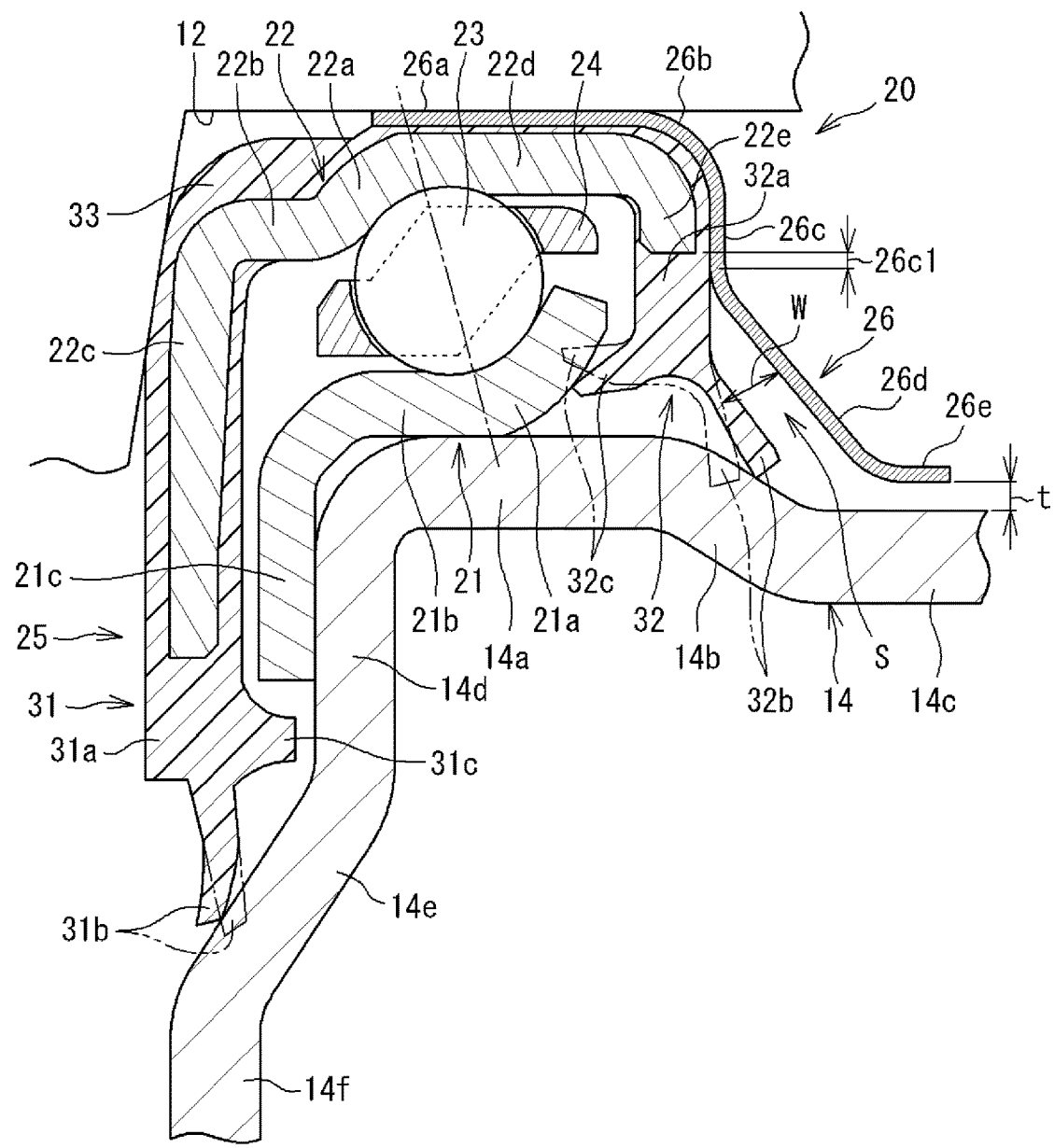
FIG. 2 is a sectional view of the thrust bearing.

FIG. 2 is a sectional view of the thrust bearing.

The thrust bearing 20 has a first bearing ring 21, a second bearing ring 22, a plurality of rolling elements 23, a cage 24, a seal 25, and a cover 26. As shown in FIG. 1, the axis of the thrust bearing 20 coincides with a kingpin axis C that is a central steering axis of a wheel. The kingpin axis C is tilted with respect to the vertical direction, and the axis of the thrust bearing 20 is also tilted with respect to the vertical direction. Hereinafter, the axis of the thrust bearing 20 is also denoted by the same sign "C" as the kingpin axis. In the following description, a direction perpendicular to the axis C of the thrust bearing 20 is referred to as radial direction.

(First Bearing Ring 21)

The first bearing ring 21 is attached to the upper surface side of the upper spring seat 14. Therefore, the upper spring seat 14 forms a mount member for the first bearing ring 21. The first bearing ring 21 is formed in an annular shape by pressing sheet metal such as a stainless steel sheet.

The first bearing ring 21 has a first raceway portion 21a that forms a raceway for the rolling elements 23. The first raceway portion 21a is curved in an arc shape substantially along the outer peripheral surface of ball that is the rolling element 23. The first raceway portion 21a is in contact with the rolling elements 23 at such a contact angle that the first raceway portion 21a is tilted with respect to the axis C of the thrust bearing 20.

The first bearing ring 21 further has a first annular portion 21b and a first cylindrical portion 21c. The first annular portion 21b is formed in an annular shape having flat surfaces (upper and lower surfaces) along the direction perpendicular to the axis C (see FIG. 1), and extends radially inward from an inner peripheral portion of the first raceway portion 21a. The first cylindrical portion 21c is formed in a cylindrical shape having outer and inner peripheral surfaces about the axis C, and is bent and extends from an inner peripheral portion of the first annular portion 21b toward one side in the axial direction (downward).

The upper spring seat 14 to which the first bearing ring 21 is attached has a fourth annular portion 14a, a first tilted portion 14b, and a fifth annular portion 14c. The fourth annular portion 14a is formed in an annular shape having flat surfaces (upper and lower surfaces) along the direction perpendicular to the axis C, and is located under the first annular portion 21b of the first bearing ring 21.

The first tilted portion 14b is formed in a conical shape having outer and inner peripheral surfaces that are tilted with respect to the axis C, and extends obliquely radially outward and downward from an outer peripheral portion of the fourth annular portion 14a. The fifth annular portion 14c is formed in an annular shape having flat surfaces (upper and lower surfaces) along the direction perpendicular to the axis C, and extends radially outward from an outer peripheral portion of the first tilted portion 14b.

In the upper spring seat 14, the first tilted portion 14b may be omitted. In this case, the fourth annular portion 14a is further extended radially outward, a first outer lip 32b that will be described later is in contact with the fourth annular portion 14a, and clearance t is provided between the fourth annular portion 14a and the distal end (seventh annular portion 26e) of the cover 26 that will be described later.

The upper spring seat 14 further has a fourth cylindrical portion 14d, a second tilted portion 14e, and a fifth cylindrical portion 14f. The fourth cylindrical portion 14d is formed in a cylindrical shape having outer and inner peripheral surfaces about the axis C, and is bent and extends from an inner peripheral portion of the fourth annular portion 14a toward the one side in the axial direction (downward).

The second tilted portion 14e is formed in a conical shape having outer and inner peripheral surfaces that are tilted with respect to the axis C, and extends obliquely toward the one side in the axial direction and radially inward from the lower end of the fourth cylindrical portion 14d. The fifth cylindrical portion 14f is formed in a cylindrical shape having outer and inner peripheral surfaces about the axis C, and extends toward the one side in the axial direction from the lower end of the second tilted portion 14e. The first cylindrical portion 21c of the first bearing ring 21 is fitted to the inner peripheral surface of the fourth cylindrical portion 14d.

In the upper spring seat 14, the second tilted portion 14e may be omitted. In this case, the fourth cylindrical portion 14d is further extended toward the one side in the axial direction, and an inner lip 31b of an inner seal 31 that will be described later is in contact with the fourth cylindrical portion 14d.

(Second Bearing Ring)

The second bearing ring 22 is attached to the lower surface side of the upper support 12. The second bearing ring 22 is formed in an annular shape by pressing sheet metal such as a stainless steel sheet. The second bearing ring 22 and the first bearing ring 21 are disposed so as to face each other in the axial direction. The second bearing ring 22 has a second raceway portion 22a that forms a raceway for the rolling elements 23. The second raceway portion 22a is curved in an arc shape substantially along the outer peripheral surface of the rolling element 23 as viewed in section. The second raceway portion 22a is in contact with the rolling elements 23 at such a contact angle that the second raceway portion 22a is tilted with respect to the axis C of the thrust bearing 20.

Since the first bearing ring 21 and the second bearing ring 22 of the present embodiment are in contact with the rolling elements 23 at a contact angle, the thrust bearing 20 can be used for applications in which the thrust bearing 20 receives not only an axial load but also a radial load. The first bearing ring 21 and the second bearing ring 22 may be in contact with the rolling elements 23 at a contact angle of zero degrees, and the thrust bearing 20 may be used for applications in which the thrust bearing 20 receive only an axial load.

The second bearing ring 22 further has a second annular portion 22b, a second cylindrical portion 22c, a third annular portion 22d, and a third cylindrical portion 22e.

The second annular portion 22b is formed in an annular shape having flat surfaces (upper and lower surfaces) along the direction perpendicular to the axis C (see FIG. 1), and extends radially inward from an inner peripheral portion of the second raceway portion 22a. The second cylindrical portion 22c is formed in a cylindrical shape having outer and inner peripheral surfaces about the axis C, and extends from an inner peripheral portion of the second annular portion 22b toward the one side in the axial direction (downward). The second cylindrical portion 22c is disposed radially inward of the first cylindrical portion 21c with a space therebetween.

The third annular portion 22d is formed in an annular shape having flat surfaces (upper and lower surfaces) along the direction perpendicular to the axis C, and extends radially outward from an outer peripheral portion of the second raceway portion 22a. The third cylindrical portion 22e is formed in a cylindrical shape having outer and inner peripheral surfaces about the axis C, and extends from an outer peripheral portion of the third annular portion 22d toward the one side in the axial direction (downward).

(Seal)

The seal 25 seals the space formed between the first bearing ring 21 and the second bearing ring 22. A lubricant such as grease is enclosed in this space. The seal 25 is an elastic body such as rubber vulcanized and bonded to the second bearing ring 22. The second bearing ring 22 also functions as a core metal of the seal 25.

One or more rubbers selected from nitrile rubber (NBR), hydrogenated nitrile rubber (HNBR), acrylic rubber (ACM), ethylene acrylic rubber (AEM), fluororubber (FKM, FPM), silicone rubber (VQM), etc. that are rubber materials with good oil resistance can be blended as appropriate and used as the rubber material for the elastic body.

When considering kneadability and vulcanization moldability of the rubber material and adhesiveness of the rubber material to the second bearing ring 22 serving as the core metal, it is also a preferred mode of use to blend with other types of rubber such as liquid NBR, ethylene propylene rubber (EPDM), natural rubber (NR), isoprene rubber (IR), styrene-butadiene rubber (SBR), and butadiene rubber (BR).

The seal 25 has the inner seal 31, an outer seal 32, and a covering portion 33. The inner seal 31 is located radially inward of the rolling elements 23 and seals the space between the first bearing ring 21 and the second bearing ring 22. The inner seal 31 is provided at the lower end portion of the second cylindrical portion 22c of the second bearing ring 22. The inner seal 31 has a base portion 31a extending downward from the lower end of the second cylindrical portion 22c and an inner lip 31b extending further downward from the base portion 31a.

The inner lip 31b contacts the upper spring seat 14. Specifically, the inner lip 31b contacts the second tilted portion 14e. In FIG. 2, the inner lip 31b in a free state (no-load state), namely not in contact with the upper spring seat 14, is shown by a long dashed double-short dashed line, and the inner lip 31b elastically deformed from the free state by contacting the upper spring seat 14 is shown by a continuous line. The inner seal 31 further has a ridge portion 31c protruding radially outward from the base portion 31a. Clearance is provided between the distal end of the ridge portion 31c and the fourth cylindrical portion 14d of the upper spring seat 14.

The outer seal 32 is located radially outward of the rolling elements 23 and seals the space between the first bearing ring 21 and the second bearing ring 22. The outer seal 32 is provided at the lower end portion of the third cylindrical portion 22e of the second bearing ring 22. The outer seal 32 has a base portion 32a, the first outer lip 32b, and a second outer lip 32c.

The base portion 32a extends downward from the lower end of the third cylindrical portion 22e of the second bearing ring 22.

The first outer lip 32b extends further downward from the lower end portion of the base portion 32a. The first outer lip 32b contacts the upper spring seat 14. Specifically, the first outer lip 32b contacts the first tilted portion 14b of the upper spring seat 14.

The second outer lip 32c extends radially inward from the lower end portion of the base portion 32a. The second outer lip 32c contacts the first bearing ring 21. Specifically, the second outer lip 32c contacts the outer surface of the first raceway portion 21a of the first bearing ring 21.

In FIG. 2, the first and second outer lips 32b, 32c in the free state are shown by a long dashed double-short dashed line, and the first and second outer lips 32b, 32c elastically deformed from the free state by contacting the upper spring seat 14 or the first bearing ring 21 are shown by a continuous line.

The covering portion 33 covers the surface of the second bearing ring 22 and connects the inner seal 31 and the outer seal 32. Specifically, the covering portion 33 covers the outer and inner peripheral surfaces of the second cylindrical portion 22c, the upper surfaces of the second annular portion 22b, second raceway portion 22a, and third annular portion 22d, and the inner and outer peripheral surfaces of the third cylindrical portion 22e of the second bearing ring 22.

(Cover)

The cover 26 is attached to the second bearing ring 22 and covers the outer seal 32 from outside in the radial direction. The cover 26 is formed by pressing sheet metal such as a stainless steel sheet. The cover 26 has a sixth annular portion 26a, a curved portion 26b, a sixth cylindrical portion 26c, a third tilted portion 26d, and the seventh annular portion 26e.

The sixth annular portion 26a is placed on the other side in the axial direction (upper side) of the third annular portion 22d of the second bearing ring 22, substantially on the other side in the axial direction (upper side) of the covering portion 33 of the seal 25 that covers the third annular portion 22d.

The curved portion 26b is curved in an arc shape from an outer peripheral portion of the sixth annular portion 26a toward the one side in the axial direction (downward). The curved portion 26b is placed on the outer peripheral surface of the boundary portion between the third annular portion 22d and the third cylindrical portion 22e of the second bearing ring 22, substantially on the outer peripheral surface of the covering portion 33 that covers the outer peripheral surface of the boundary portion.

The sixth cylindrical portion 26c extends toward the one side in the axial direction (downward) from the end on the one side in the axial direction (lower side) of the curved portion 26b. The sixth cylindrical portion 26c is fitted to the outer peripheral surface of the third cylindrical portion 22e of the second bearing ring 22, substantially to the outer peripheral surface of the covering portion 33 of the seal 25 that covers the third cylindrical portion 22e.

The sixth cylindrical portion 26c extends toward the one side in the axial direction (downward) beyond the third cylindrical portion 22e, and is in contact with the outer peripheral surface of the base portion 32a of the outer seal 32. A part 26c1 of the sixth cylindrical portion 26c that contacts the outer peripheral surface of the base portion 32a of the outer seal 32 forms the "support portion" that presses and supports the base portion 32a from outside in the radial direction.

The third tilted portion 26d obliquely extends from the end on the one side in the axial direction of the sixth cylindrical portion 26c further toward the one side in the axial direction and radially outward. The third tilted portion 26d extends linearly and is formed in a substantially conical shape. The third tilted portion 26d forms the "extended portion" extending from the second bearing ring 22 side toward the upper spring seat 14 side. The extended portion is not limited to the linearly extending form, and may be in a shape curved radially outward or radially inward. An example in which the extended portion is curved radially outward will be described later as a second embodiment.

The third tilted portion 26d is formed such that, when the first outer lip 32b of the outer seal 32 is in the free state shown by the long dashed double-short dashed line, the distance W between the third tilted portion 26d and the outer seal 32 gradually increases from the second bearing ring 22 side toward the upper spring seat 14 side (one side in the axial direction).

A space S is formed among the third tilted portion 26d, the outer seal 32, and the upper spring seat 14 so as to be surrounded by these. This space S has such a sectional area that the outer seal 32 will not contact the third tilted portion 26d of the cover 26 even if the outer seal 32 is elastically deformed radially outward while the strut-type suspension 10 is in use.

The seventh annular portion 26e of the cover 26 extends radially outward from an outer peripheral portion of the third tilted portion 26d. The seventh annular portion 26e is located substantially parallel to the fifth annular portion 14c of the upper spring seat 14. Clearance t is provided between the seventh annular portion 26e and the fifth annular portion 14c. This clearance t is preferably set to 0.5 mm to 1.5 mm, and is more preferably set to about 1 mm.

The seventh annular portion 26e and the fifth annular portion 14c may be in contact with each other. Alternatively, the seventh annular portion 26e may be omitted, and the clearance t may be provided between the extended portion 26d and the fifth annular portion 14c or the extended portion 26d and the fifth annular portion 14c may be in contact with each other.

The cover 26 may be directly placed on the third annular portion 22d and third cylindrical portion 22e of the second bearing ring 22 without the covering portion 33 interposed therebetween.

Functions and Effects of First Embodiment

Figure 5:
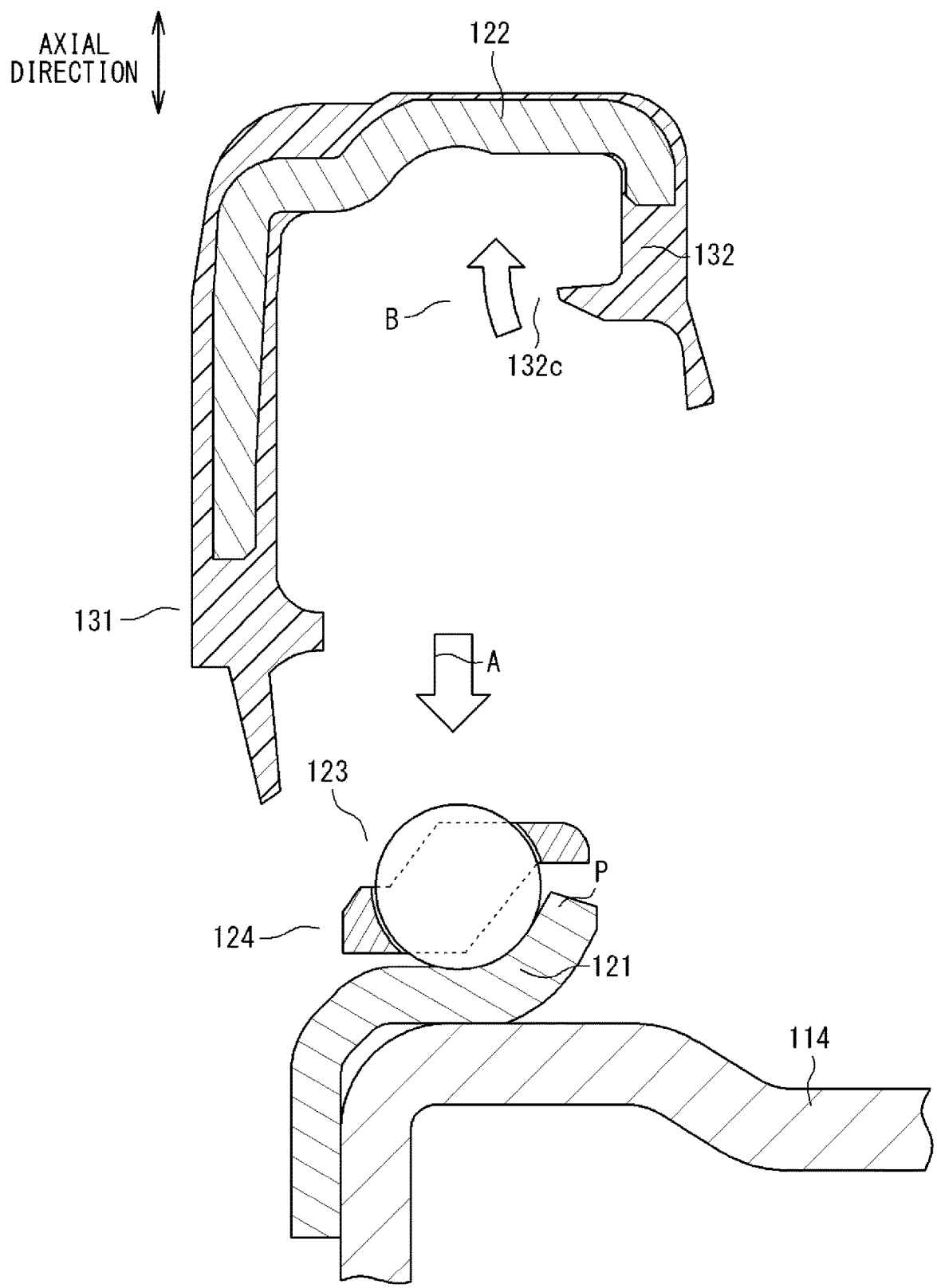
FIG. 5 is an illustration showing an assembly process of the thrust bearing.

The thrust bearing 20 of the first embodiment includes: the annular first bearing ring 21; the second bearing ring 22 facing the first bearing ring 21 in the axial direction; the plurality of rolling elements 23 rollably arranged between the first bearing ring 21 and the second bearing ring 22; the outer seal 32 provided on the second bearing ring 22, located radially outward of the rolling elements 23, and sealing the space between the first bearing ring 21 and the second bearing ring 22; and the cover 26 covering the outer seal 32 from outside in the radial direction. The cover 26 can reduce the possibility that muddy water etc. may reach the outer seal 32. Therefore, the effect of preventing entry of water and foreign matter such as muddy water into the thrust bearing 20 can be enhanced without the need to increase the rigidity of the outer seal 32 in order to increase the strain force of the second outer lip 32c against the first bearing ring 21. Since it is not necessary to increase the rigidity of the outer seal 32 in order to enhance the effect of preventing entry of muddy water etc., such defective assembly that the second outer lip 32c (132c) of the outer seal 32 (132) remains reversely bent as described with reference to, for example, FIG. 5 is less likely to occur when attaching the second bearing ring 22 (122) to the first bearing ring 21 (121).

In the thrust bearing 20 of the first embodiment, the cover 26 has the support portion 26c1 that contacts the outer peripheral surface of the outer seal 32 and presses the outer seal 32 from outside in the radial direction. Therefore, radially outward elastic deformation of the outer seal 32 can be reduced, the strain force of the second outer lip 32c against the first bearing ring 21 can be increased, and the effect of preventing entry of muddy water etc. can further be enhanced, without the need to increase the rigidity of the outer seal 32. Moreover, such defective assembly that the second outer lip 32c remains reversely bent can be reduced by attaching the cover 26 to the second bearing ring 22 after assembly of the thrust bearing 20.

In the thrust bearing 20 of the first embodiment, the cover 26 has the extended portion 26d extending from the first bearing ring 21 side toward the upper spring seat 14. Therefore, the extended portion 26d can block splashed muddy water etc. from outside and can effectively reduce the possibility that the muddy water etc. may reach the outer seal 32.

In the thrust bearing 20 of the first embodiment, the space S is formed among the extended portion 26d, the outer seal 32, and the upper spring seat 14. If it were not for the space S, foreign matter such as mud would tend to clog between the outer seal 32 and the extended portion 26d, and the first outer lip 32b would be pressed hard against the upper spring seat 14, which may increase the rotational resistance of the thrust bearing 20. In the above embodiment, the space S is formed among the outer seal 32, the extended portion 26d, and the upper spring seat 14. Therefore, even if muddy water etc. enters the space S, the muddy water etc. can be moved within the space S. This can reduce clogging of mud etc. between the outer seal 32 and the extended portion 26d.

The cover 26 has, at the distal end of the extended portion 26d, the seventh annular portion 26e disposed substantially parallel to the upper spring seat 14, and the clearance t is provided between the seventh annular portion 26e and the upper spring seat 14. Since the seventh annular portion 26e extending further radially outward from the extended portion 26d is provided, the clearance t can be made longer in the radial direction. This can further reduce the possibility that muddy water etc. may reach the outer seal 32. Since the seventh annular portion 26e is formed in a flat shape substantially parallel to the upper spring seat 14, the clearance t between the seventh annular portion 26e and the upper spring seat 14 is kept narrow. This further reduces entry of muddy water into the clearance t.

Since the clearance t is provided between the seventh annular portion 26e of the cover 26 and the upper spring seat 14, muddy water can be easily drained even if it enters inside the cover 26. In particular, if it were not for the clearance t in the case where the axis C of the thrust bearing 20 is tilted with respect to the vertical direction as shown in FIG. 1, muddy water etc. would accumulate in the space S on the inner side of the vehicle body that is located at a lower position, and would be more likely to pass through the outer seal 32 and enter between the first bearing ring 21 and the second bearing ring 22. It is therefore more effective to provide the clearance t.

As shown in FIG. 2, the part of the space S that leads to the clearance t has a sectional area (and capacity) that is larger in the axial direction than the clearance t. Therefore, muddy water etc. having entered through the clearance t enters the space S larger than the clearance t, and can easily move in the space S. As a result, clogging of foreign matter such as mud in the space S can further be reduced.

The cover 26 has the sixth annular portion 26a placed on the upper surface of the third annular portion 22d of the second bearing ring 22 (substantially the covering portion 33 that covers the third annular portion 22d). The sixth annular portion 26a allows the cover 26 to be attached in a stable attitude to the second bearing ring 22. When the cover 26 does not have the sixth annular portion 26a, the cover 26 is attached to the second bearing ring 22 either only by the sixth cylindrical portion 26c or by the sixth cylindrical portion 26c and the curved portion 26b. The sixth cylindrical portion 26c and the curved portion 26b are substantially placed on the covering portion 33 of the seal 25. However, since the covering portion 33 is an elastic body, the covering portion 33 is not formed with very strict dimensional accuracy. Therefore, the attitude of the cover 26 placed on the covering portion 33 becomes unstable, and the dimension of the clearance t between the upper spring seat 14 and the cover 26 and the capacity of the space S tend to vary. In the present embodiment, the cover 26 has the sixth annular portion 26a, and the sixth annular portion 26a is placed on the second bearing ring 22 (and the covering portion 33 that covers the second bearing ring 22). Therefore, the cover 26 can be attached in a stable attitude to the second bearing ring 22.

Second Embodiment

Figure 3:
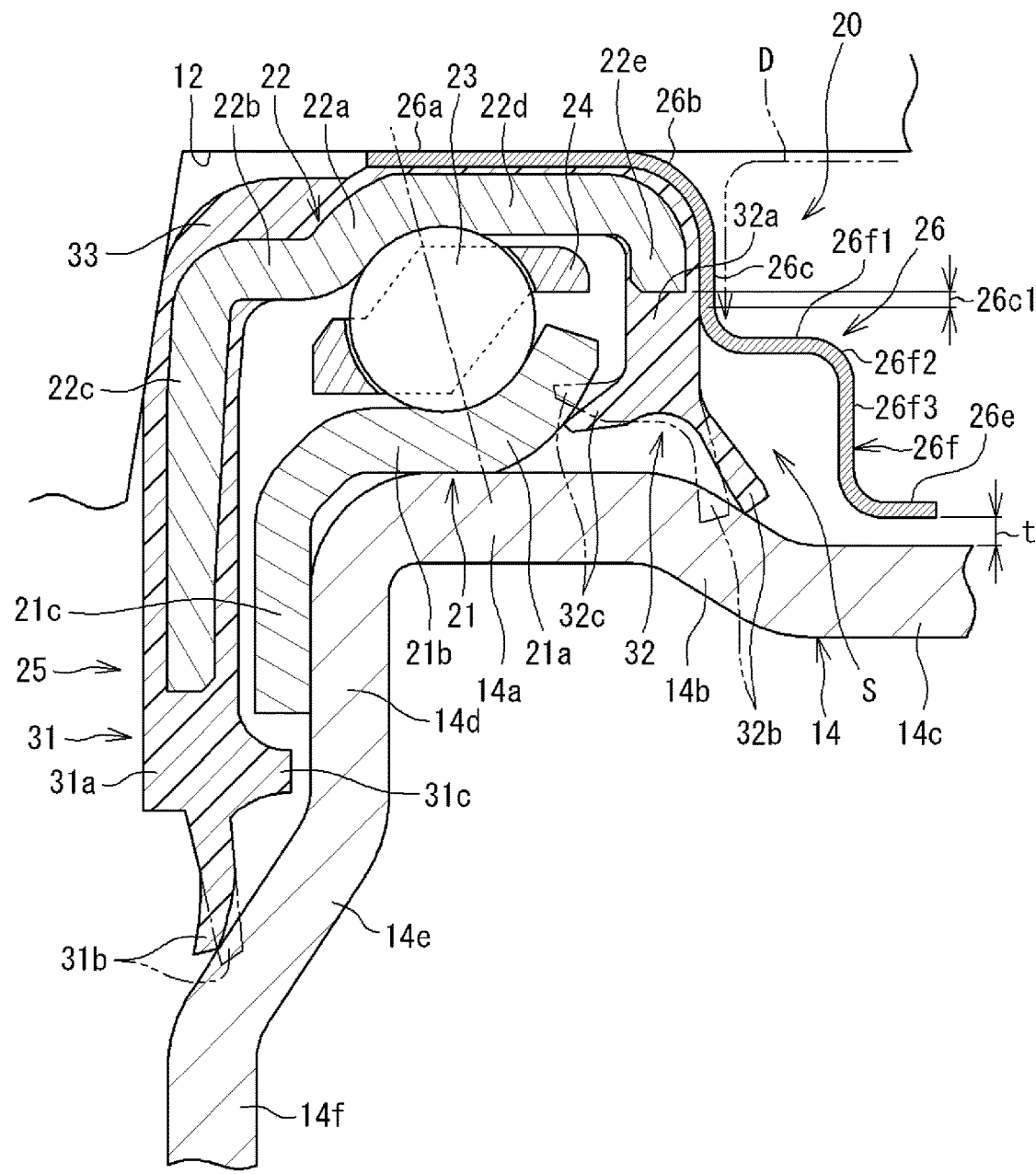
FIG. 3 is a sectional view of a thrust bearing according to a second embodiment.
Figure 4:
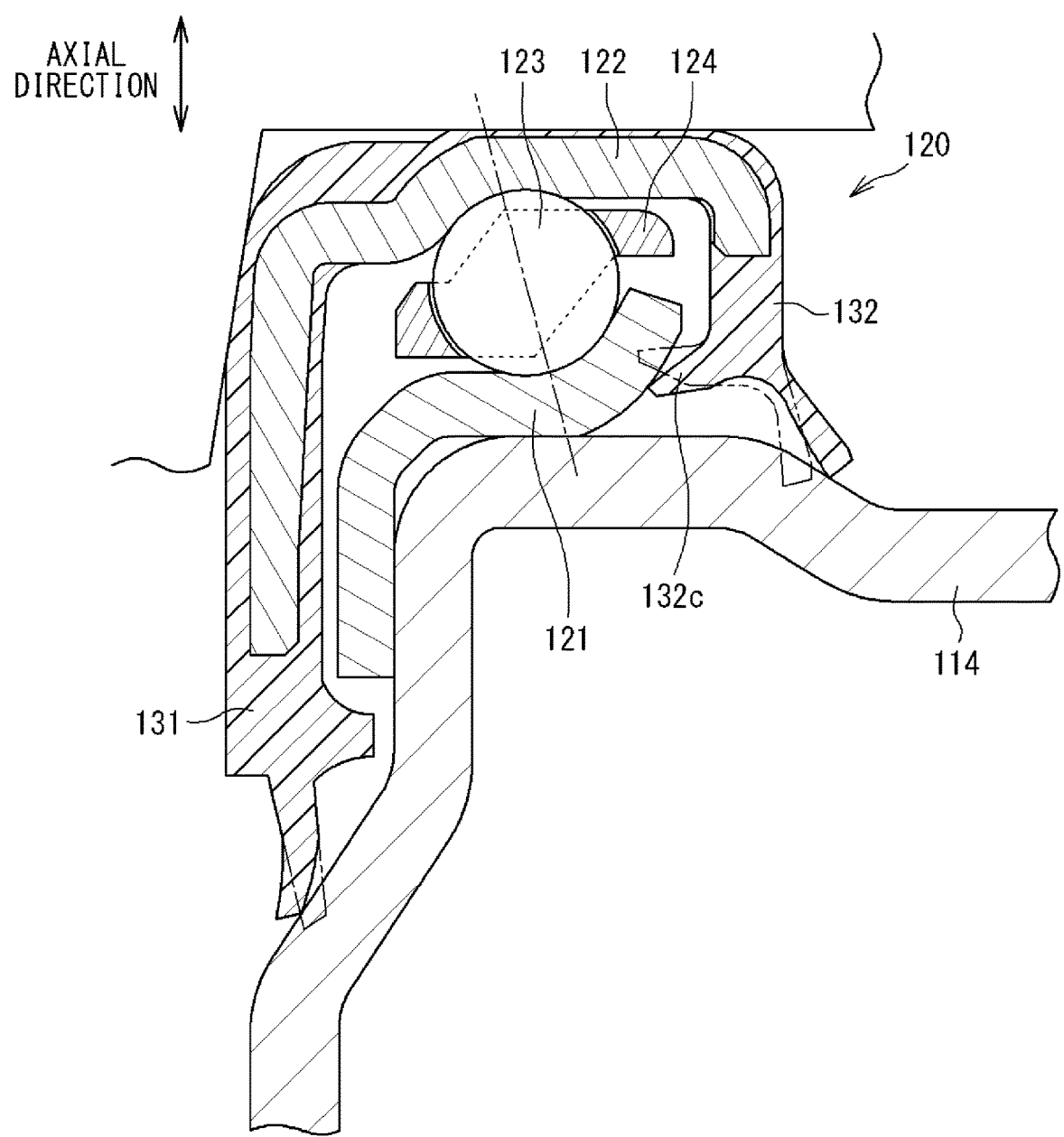
FIG. 4 is a sectional view of a conventional thrust bearing.

FIG. 3 is a sectional view of a thrust bearing according to a second embodiment. The thrust bearing according to the second embodiment is different from the first embodiment in the structure of the cover 26. Specifically, the cover 26 of the present embodiment has the sixth annular portion 26a, the curved portion 26b, the sixth cylindrical portion 26c, and the seventh annular portion 26e that are substantially the same as those of the first embodiment. However, the cover 26 of the present embodiment is different in the shape of the extended portion that is illustrated by the third tilted portion 26d in the first embodiment.

An extended portion 26f of the present embodiment has an eighth annular portion 26f1, a second curved portion 26f2, and a seventh cylindrical portion 26f3. The eighth annular portion 26f1 is formed in an annular shape having flat surfaces (upper and lower surfaces) along the direction perpendicular to the axis C (see FIG. 1), and extends radially outward from the end on the one side in the axial direction (lower side) of the sixth cylindrical portion 26c.

The second curved portion 26f2 is curved in an arc shape from an outer peripheral portion of the eighth annular portion 26f1 toward the one side in the axial direction (downward). The seventh cylindrical portion 26f3 extends toward the one side in the axial direction (downward) from the end on the one side in the axial direction (lower side) of the second curved portion 26f2. The seventh annular portion 26e is connected to the lower end of the seventh cylindrical portion 26f3.

Functions and Effects of Second Embodiment

According to the second embodiment, in the case where the axis C of the thrust bearing 20 is tilted with respect to the vertical direction as shown in FIG. 1, muddy water flowing along the lower surface of the upper support 12 flows downward along the sixth cylindrical portion 26c of the cover 26 and tends to accumulate in the boundary portion between the sixth cylindrical portion 26c and the eighth annular portion 26f1, as shown by arrow D in FIG. 3. Due to the tilt of the axis C, the muddy water flows from the outer side of the vehicle body toward the inner side of the vehicle body along the boundary portion between the sixth cylindrical portion 26c and the eighth annular portion 26f1 as this boundary portion serves as a "gutter." This can further reduce entry of the muddy water flowing along the upper support 12 into the clearance t between the cover 26 and the upper spring seat 14.

Other configurations of the second embodiment are the same as those of the first embodiment and therefore have the same functions and effects as those of the first embodiment.

The embodiments disclosed herein are illustrative in all respects and not restrictive. The scope of the present invention is shown by the claims rather than by the above embodiments, and is intended to include all modifications within the meaning and scope equivalent to those of the claims.

The ordinal numbers such as "first" and "second" given to the annular portions, cylindrical portions, tilted portions, etc. that are components of the first and second bearing rings and upper spring seat 14 described above are given to distinguish them from each other, and the ordinal numbers themselves have no meaning. Therefore, the ordinal numbers may be omitted or may be replaced with other ordinal numbers.

DESCRIPTION OF THE REFERENCE NUMERALS

14 . . . Upper Spring Seat (Mount Member), 20 . . . Thrust Bearing, 21 . . . First Bearing Ring, 22 . . . Second Bearing Ring, 23 . . . Rolling Element, 26 . . . Cover, 26c1 . . . Support Portion, 26d . . . Extended Portion, 32 . . . Outer Seal, S . . . Space

The invention claimed is:
1. A thrust bearing comprising:
an annular first bearing ring;
an annular second bearing ring facing the first bearing ring in an axial direction;
a plurality of rolling elements rollably arranged between the first bearing ring and the second bearing ring;
an outer seal provided on the second bearing ring, located radially outward of the rolling elements, and sealing a space between the first bearing ring and the second bearing ring; and
a cover covering the outer seal from outside in a radial direction, wherein:

the cover includes
- an inner cylindrical portion extending in the axial direction on a radially outer side of the outer seal between a first mount member to which the first bearing ring is attached and a second mount member to which the second bearing ring is attached;
- an inner annular portion extending outward in the radial direction perpendicular to the axial direction from an end of the inner cylindrical portion on the side of the first mount member;
- an outer cylindrical portion connected to a radially outer end of the inner annular portion and extending toward the first mount member; and
- an outer annular portion connected to an end on the one side in the axial direction of the outer cylindrical portion on the side of the first mount member and extending outward in the radial direction.

2. The thrust bearing according to claim 1, wherein the cover includes a support portion that contacts an outer peripheral surface of the outer seal and presses the outer seal from the outside in the radial direction.

3. The thrust bearing according to claim 1, wherein there is a space among the cover, the outer seal, and the first mount member.

* * * * *